United States Patent
Blatchford et al.

(10) Patent No.: US 9,242,316 B2
(45) Date of Patent: Jan. 26, 2016

(54) METHOD FOR RETROFITTING A DOUBLE FLOW STEAM TURBINE

(71) Applicant: ALSTOM Technology Ltd, Baden (CH)

(72) Inventors: David Paul Blatchford, Rugby (GB); Andrew Martin Diesch, Rugby (GB); David Lloyd Bell, Naseby (GB); Suyog Sidram Ghodake, Uttar Pradesh (IN)

(73) Assignee: ALSTOM Technology Ltd, Baden (CH)

( * ) Notice: Subject to any disclaimer, the term of this patent is extended or adjusted under 35 U.S.C. 154(b) by 128 days.

(21) Appl. No.: 14/030,408

(22) Filed: Sep. 18, 2013

(65) Prior Publication Data
US 2014/0013598 A1 Jan. 16, 2014

Related U.S. Application Data

(63) Continuation of application No. PCT/EP2011/059245, filed on Jun. 6, 2011.

(30) Foreign Application Priority Data

Mar. 18, 2011 (IN) .............................. 758/DEL/2011

(51) Int. Cl.
*B23P 6/00* (2006.01)
*F01D 3/02* (2006.01)
*F01D 3/04* (2006.01)
(Continued)

(52) U.S. Cl.
CPC . *B23P 6/002* (2013.01); *F01D 3/02* (2013.01); *F01D 3/04* (2013.01); *F01D 5/005* (2013.01); *F01D 25/26* (2013.01);
(Continued)

(58) Field of Classification Search
CPC ............ B60C 11/0304; B60C 11/1323; B60C 11/042; F01D 25/24; F01D 25/26; F01D 5/187; Y10T 29/49238
See application file for complete search history.

(56) References Cited

U.S. PATENT DOCUMENTS

| 3,592,557 A | 7/1971 | Haas et al. |
| 5,110,256 A | 5/1992 | Groenendaal, Jr. |
| 6,752,589 B2 * | 6/2004 | Vogan et al. ................... 415/103 |

(Continued)

FOREIGN PATENT DOCUMENTS

| CN | 1242817 A | 1/2000 |
| JP | S5770903 A | 5/1982 |
| WO | 2009/124585 | 10/2009 |

OTHER PUBLICATIONS

Decision of Patent Grant for KR Application No. 10-2013-7027362, dated Mar. 24, 2015 issued by the Korean Intellectual Property Office.

*Primary Examiner* — David Bryant
*Assistant Examiner* — Lee A Holly

(57) ABSTRACT

The method for retrofitting a double flow steam turbine includes opening an outer casing of the steam turbine, removing the blade carriers and the stator blades, removing the inner casing with inlet belt, removing the double flow rotor and the rotor blades. Thus, the method includes the further steps of providing a new single flow rotor and new rotor blades different from the rotor blades connected to the double flow rotor, providing balancers connected to the single flow rotor, to balance the axial thrust, providing new stator blade carriers and new stator blades different from the stator blades associated to the double flow rotor, providing a new inner casing with inlet belt, providing a passage between the inner casing and the outer casing, closing the outer casing.

9 Claims, 3 Drawing Sheets

(51) Int. Cl.
 *F01D 5/00* (2006.01)
 *F01D 25/26* (2006.01)
(52) U.S. Cl.
 CPC ........ *F05D 2220/31* (2013.01); *F05D 2230/80* (2013.01); *Y10T 29/49229* (2015.01)

(56) References Cited

U.S. PATENT DOCUMENTS

2004/0071544 A1  4/2004 Vogan et al.
2008/0213085 A1* 9/2008 Deidewig et al. ............. 415/104

* cited by examiner

METHOD FOR RETROFITTING A DOUBLE FLOW STEAM TURBINE

CROSS-REFERENCE TO RELATED APPLICATIONS

This application claims priority to PCT/EP2011/059245 filed Jun. 6, 2011, which in turn claims priority to Indian application 758/DEL/2011 filed Mar. 18, 2011, both of which are hereby incorporated in their entireties.

TECHNICAL FIELD

The present invention relates to a method for retrofitting a double flow steam turbine.

BACKGROUND

FIG. 1 shows a double flow steam turbine.

Double flow steam turbines 1 have a double flow rotor 2 that carries rotor blades 3, 4 and correspondingly stator blades carriers 5, 6 that carry stator blades 7, 8, defining two symmetrical steam paths 9, 10.

Steam is supplied via an inner casing 11a with an inlet belt 11b and passes through the steam paths 9, 10 to be then discharged through exhaust areas 13, 14; from the exhaust areas 13, 14 the steam S passes down through the condenser neck 15 to reach the condenser.

In some cases, the exhaust areas 13, 14 are too large; for example the steam turbine actual operation could occur with a lower mass flow than the design mass flow or with a higher backpressure than the design one.

In order to improve efficiency and maximise performance, the exhaust areas 13, 14 should be modified in order to match the actual capacity conditions of the condenser.

SUMMARY

The technical aim of the present invention therefore includes providing a method for retrofitting a double flow steam turbine by which the retrofitted steam turbine has improved matching between exhaust areas and the condenser conditions.

Within the scope of this technical aim, an aspect of the invention is to provide a method by which efficiency and performances of a steam turbine are improved.

Another aspect of the invention is to provide a method that is cost effective and time effective.

The technical aim, together with these and further aspects, are attained according to the invention by providing a method in accordance with the accompanying claims.

BRIEF DESCRIPTION OF THE DRAWINGS

Further characteristics and advantages of the invention will be more apparent from the description of a preferred but non-exclusive embodiment of the method, illustrated by way of non-limiting example in the accompanying drawings, in which.

DETAILED DESCRIPTION

Figure 1:
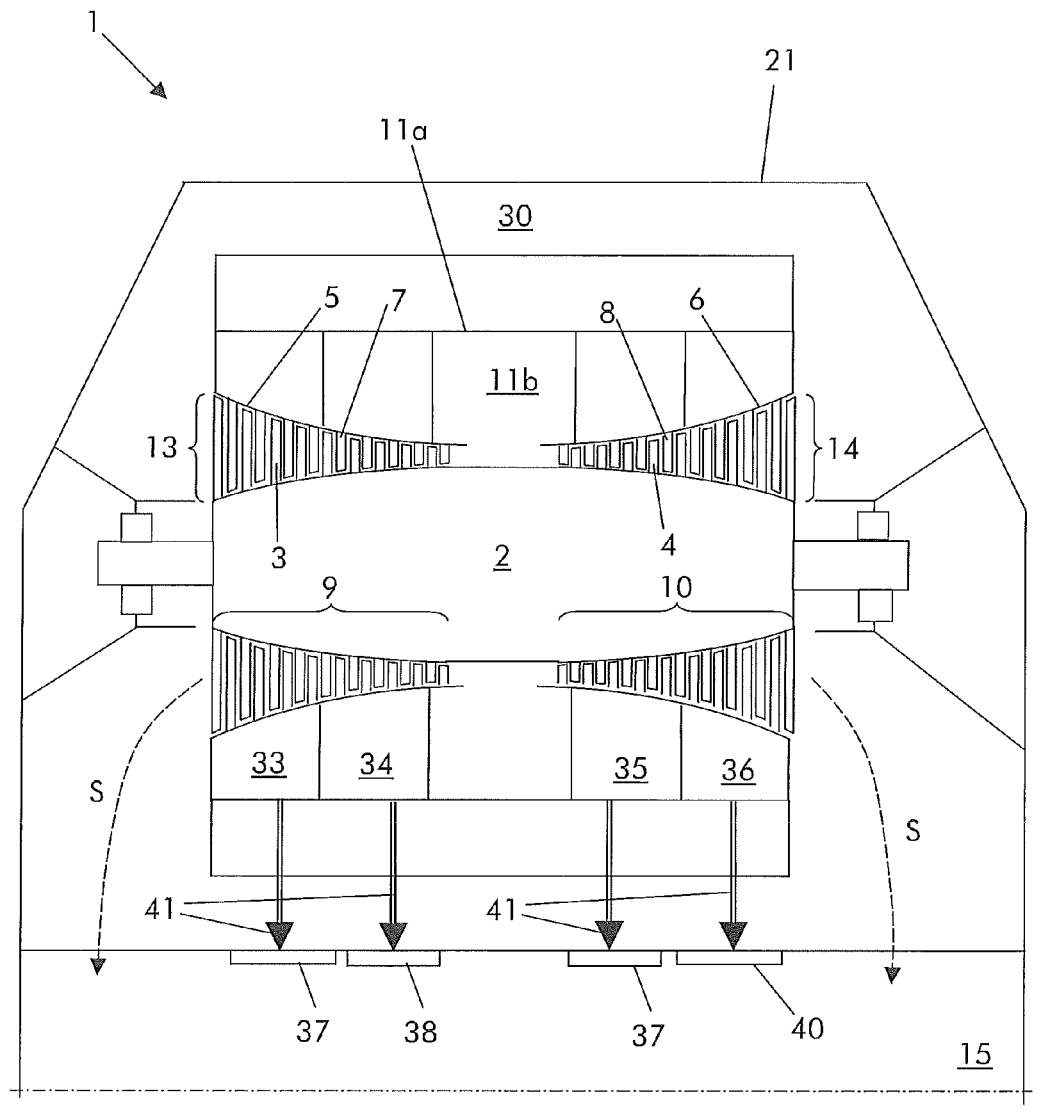
FIG. 1 is a schematic longitudinal section of a double flow steam turbine.
Figure 2:
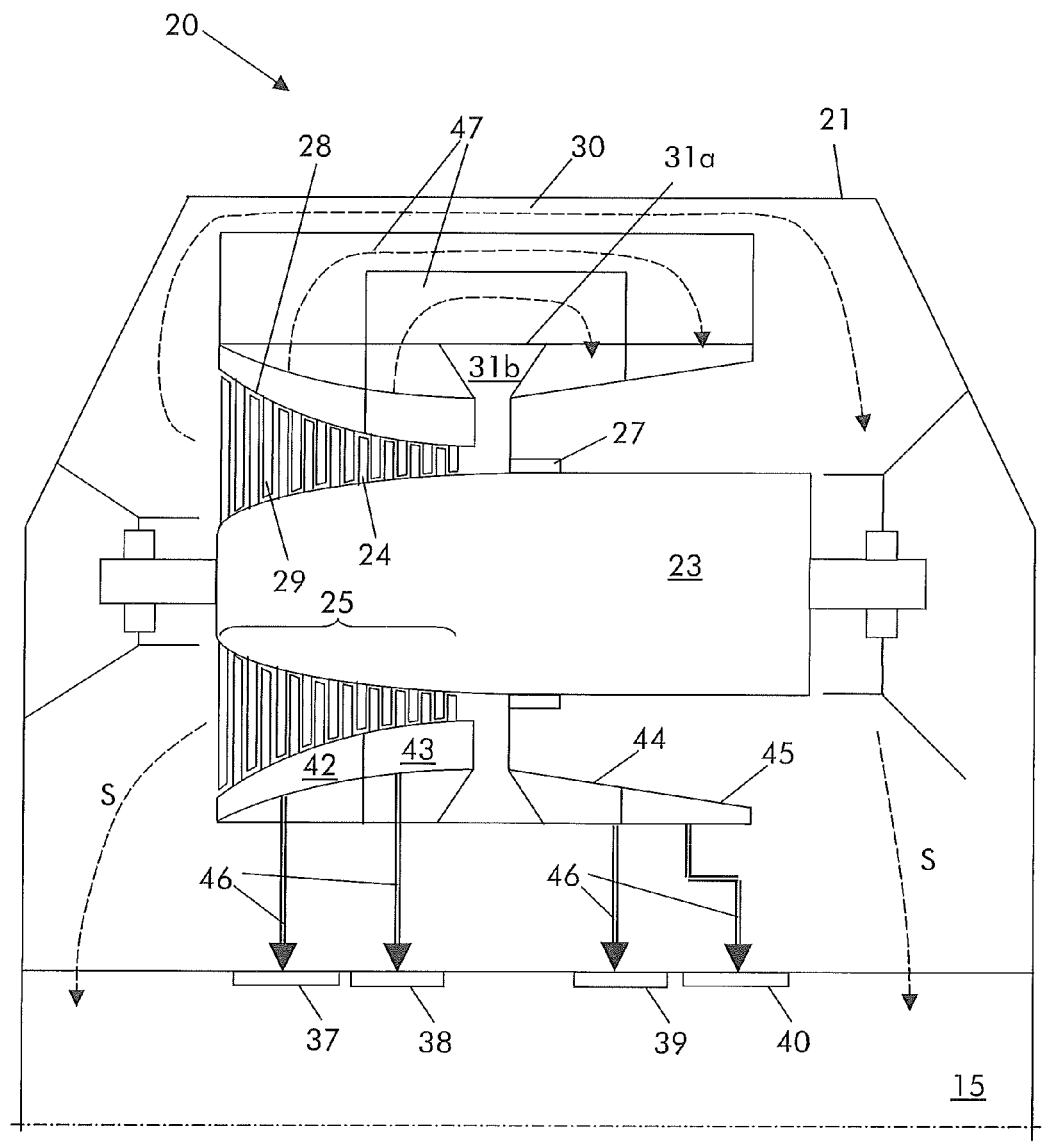
FIG. 2 is a schematic longitudinal section of a single flow steam turbine.

In the following reference to FIGS. 1 and 2 is made.

In order to retrofit a double flow steam turbine 1 such that the exhaust areas 13, 14 better match the condenser conditions, the double flow steam turbine 1 is converted into a single flow steam turbine 20.

In order to reduce the time and costs of the retrofitting, only the inner module of the double flow steam turbine 1 is replaced, but the outer casing 21 (with frame, hoods, bearings that are typically part of the frame) are not replaced (i.e. the original outer casing 21 used with the double flow steam turbine 1 is also used with the single flow steam turbine 20).

In particular, the method comprises the steps of:
  opening the outer casing 21,
  removing the blade carriers 5, 6 and the stator blades 7, 8,
  removing the inner casing 11a with inlet belt 11b,
  removing the double flow rotor 2 and the rotor blades 3, 4 connected thereto.

Thus, after the inner module has been removed, a new inner module is introduced within the outer casing 21.

In particular, the method comprises the further steps of:
  providing a new single flow rotor 23 and new rotor blades 24 different from the rotor blades 3, 4 connected to the double flow rotor 2 (for example they can be longer), such that the whole steam (that was originally processed via the two steam paths 9, 10) can be processed via the one single flow path 25 of the single flow steam turbine 20,
  providing balancers (for example a particular embodiment of balancers is identified by reference 27 in FIG. 2, this and other embodiments of balancers will be explained in detail below); the balancers 27 are connected to the single flow rotor 23 to balance the axial thrust that was originally naturally self balanced by the double flow rotor 2,
  providing new stator blade carriers 28 and new stator blades 29 different from (for example longer than) the stator blades 7, 8 associated to the double flow rotor 2,
  providing a new inner casing 31a with inlet belt 31b,
  providing at least a passage 30 between the inner casing 31a and the outer casing 21.

Finally, the method comprises closing the outer casing 21.

Thus, according to the method the outer casing 21 used with the single flow rotor 23 is the same outer casing 21 provided with the double flow rotor 2.

In particular, FIG. 1 shows an example of double flow steam turbine 1 that is also provided with extraction chambers 33, 34, 35, 36 connected to heater extraction ports 37, 38, 39, 40 of the outer casing 21 via ducts 41.

Not all steam turbines are provided with extraction chambers 33-36; it is clear that when provided they must also be replaced.

Thus, when the extraction chambers 33-36 are provided, the method comprises the further steps of:
  removing the extraction chambers 33-36 and ducts 41,
  providing new extraction chambers 42, 43, 44, 45,
  providing ducts 46 connecting the new extraction chambers 42-45 to the heater extraction ports 37-40 of the outer casing 21.

Since the heater extraction ports 37-40 extend over the whole length of the outer casing 21, the new extraction chambers 42-45 are placed at opposite axial sides of the inlet belt 31b that is arranged to supply steam to the single flow steam turbine 20 (in particular to the single flow path 25).

Additionally, also channels 47 connecting the extraction chambers 42, 43, 44, 45 together are provided.

In particular, these channels 47 are such that they overcome the inlet belt 31b without requiring a reduction of its cross section.

For example FIG. 2 schematically shows an example of such channels 47; it is clear that in different embodiments they can also have a different configuration.

The balancers can be balance pistons 27 (this is the embodiment shown in FIG. 2).

Alternatively (FIG. 3), in case after retrofitting two or four or more single flow steam turbines 20 are provided, each single flow steam turbines 20 can balance the thrust of another single flow steam turbine 20.

Figure 3:
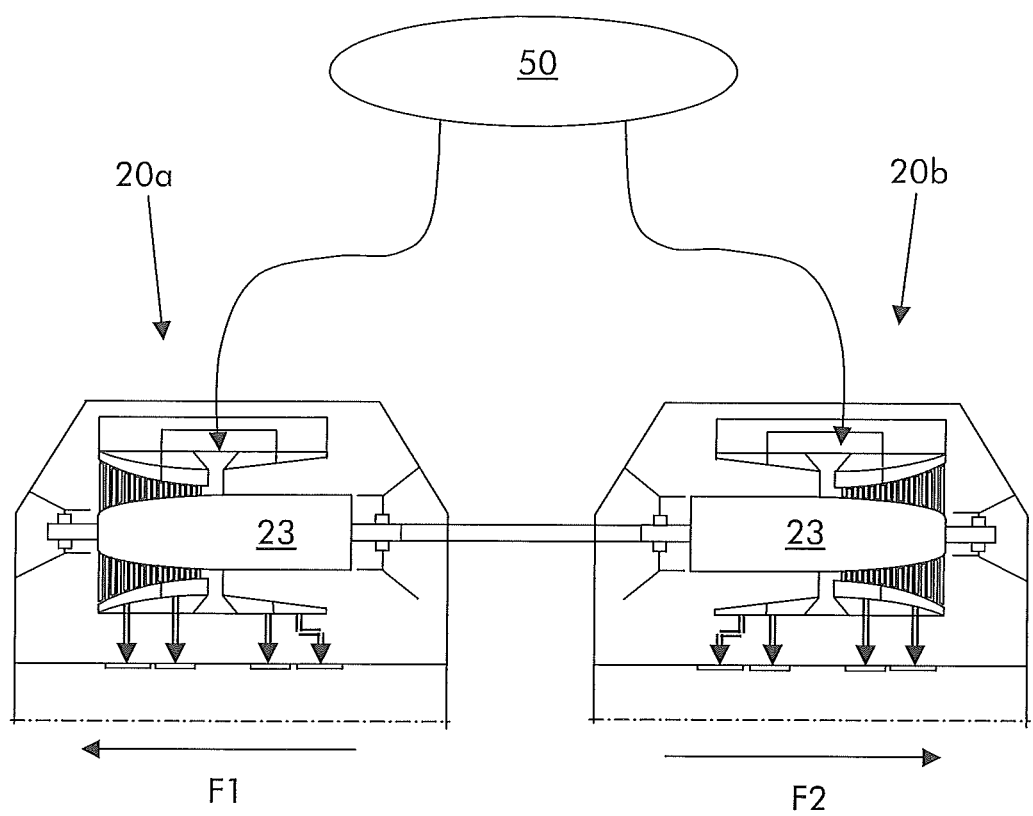
FIG. 3 shows an example of two single flow steam turbines reciprocally connected.

With reference to FIG. 3, two single flow steam turbines 20 are shown connected to each other (in particular their rotors 23 are reciprocally connected).

Thanks to this configuration, a balancer of a first single flow steam turbine 20a comprises a second single flow steam turbine 20b associated to the first single flow steam turbine 20a and vice versa; in this case the mutually associated single flow steam turbines 20a, 20b have opposite flow directions F1 and F2.

Advantageously, in this embodiment the mutually associated single flow steam turbines 20a, 20b have a common inlet pipe 50; this advantageously ensures that one steam turbine 20a or 20b does not receive any flow when the other 20b or 20a does not.

The method is cost effective and time effective because only the inner module must be replaced, i.e. the outer casing 21 and all the connections are not replaced.

Naturally the features described may be independently provided from one another.

In practice the materials used and the dimensions can be chosen at will according to requirements and to the state of the art.

The invention claimed is:

1. A method for retrofitting a double flow steam turbine, the double flow steam turbine having:
    an outer casing;
    blade carriers with stator blades;
    an inner casing with inlet belt; and
    a double flow rotor with rotor blades, wherein the method comprises:
    opening the outer casing;
    removing the blade carriers and the stator blades;
    removing the inner casing with inlet belt;
    removing the double flow rotor and the rotor blades;
    providing and installing a new single flow rotor and new rotor blades different from the rotor blades connected to the double flow rotor;
    providing and installing balancers connected to the single flow rotor, to balance the axial thrust;
    providing and installing new stator blade carriers and new stator blades different from the stator blades associated to the double flow rotor;
    providing and installing a new inner casing with inlet belt;
    providing and installing at least a passage between the inner casing and the outer casing; and
    closing the outer casing.

2. The method according to claim 1, wherein the outer casing used with the single flow rotor is the same outer casing provided with the double flow rotor.

3. The method according to claim 1, wherein the double flow steam turbine is also provided with extraction chambers connected to heater extraction ports of the outer casing via ducts, the method further comprising:
    removing the extraction chambers and ducts;
    providing new extraction chambers; and
    providing new ducts connecting the new extraction chambers to the heater extraction ports of the outer casing.

4. The method according to claim 3, wherein the new extraction chambers are placed at opposite axial sides of the inlet belt arranged to supply steam to the single flow rotor.

5. The method according to claim 3, further comprising providing channels connecting the new extraction chambers together.

6. The method according to claim 5, wherein the channels overcome the inlet belt without requiring a reduction of its cross section.

7. The method according to claim 1, wherein the balancers comprise balance pistons.

8. The method according to claim 1, wherein the balancers comprise a single flow steam turbine reciprocally connected to the rotor and further having opposite flow directions to that of the retrofitted double flow steam turbine.

9. The method according to claim 8, wherein the mutually associated single flow steam turbines have a common inlet pipe, and
    wherein the single flow steam turbine and the retrofitted double flow steam turbine have a common inlet pipe.

* * * * *